Patented Nov. 28, 1950

2,532,031

UNITED STATES PATENT OFFICE 2,532,031

SEPARATION OF C₈H₁₀ AROMATIC HYDROCARBONS BY EXTRACTIVE DISTILLATION

Alan C. Nixon, Berkeley, Carl H. Deal, Jr., Alameda, and Roy J. Evans, Oakland, Calif., assignors to Shell Development Company, San Francisco, Calif., a corporation of Delaware No Drawing. Application April 6, 1948,
Serial No. 19,434

8 Claims. (Cl. 202—39.5)

This invention relates to the separation of mixtures of unsaturated ring-containing compounds containing only carbon and hydrogen atoms outside the ring. More particularly, it is concerned with the separation of the components of mixtures of alkyl benzenes having relatively similar boiling temperatures and which are difficult to separate by simple fractional distillation.

With the rapid development in recent years of the production of aromatic hydrocarbons from non-aromatic hydrocarbons in petroleum fractions by certain petroleum refining and conversion processes including dehydrogenation of alkylated cyclohexanes, difficultly separable mixtures of similarly volatile isomeric alkylated aromatic hydrocarbons have been produced in large quantities. When applied to such uses as in motor fuels these mixtures are suitable without separation of the constituents. But in many instances, particularly as materials for the preparation of chemicals, it is desirable to have available the individual molecular compounds and not a mixture of related hydrocarbons. A mixture of ortho-, meta- and para-xylenes and of ethyl benzene is representative of such a mixture of isomeric aromatic hydrocarbons which is produced from certain petroleum conversion and refining operations. For purposes of chemical conversion, for example, of the ortho-xylene to phthalic anhydride, of the para-xylene to terephthalic acid and of the ethyl benzene to styrene, it is desirable to effect a separation of the individual constituents. Other mixtures of present commercial interest and which contain aromatic-like rings with alkyl substituent groups, e. g. alkyl-substituted heteroaromatic compounds, are the picolines, the lutidines, and the alkyl thiophenes.

Various methods have been proposed to effect various ones of the indicated separations, but no entirely satisfactory methods are available to effect all of the desired separations. For instance, a relatively good separation of ortho-xylene from the other substances may be obtained by simple fractional distillation since the boiling point of the ortho-isomer is 144.4° C. while those of the meta- and para-isomers are 139.1° C. and 138.3° C., respectively, and that of ethyl benzene is 136.2° C. But separation of the other three components, which boil at substantially the same temperature, poses a different problem.

It is known to separate mixtures of different types of hydrocarbons, such as saturated paraffinic and unsaturated paraffinic hydrocarbons, paraffinic and naphthenic hydrocarbons, aromatic and non-aromatic hydrocarbons, etc., both by vapor-liquid and liquid-liquid solvent extractions using various selective solvents and by extractive distillation with certain selective solvents. However, such methods have not been applied to separating isomeric aromatic hydrocarbons.

It is, therefore, a principal object of the present invention to provide an efficient and economical process for the separation of mixtures of isomeric alkyl substitued aromatic compounds. A further object is to provide a process for the separation of the components of a mixture of ortho-xylene, meta-xylene, para-xylene and ethyl benzene. A more specific object is to provide an improved process for the separation of a mixture of ethyl benzene and para-xylene, of a mixture of the ethyl benzene and meta-xylene and of a mixture of meta- and ortho-xylenes. Another object is to separate ethyl benzene from a mixture thereof with meta-, para- and ortho-xylenes. These and other objects will be better understood from the description of the invention as given hereinafter.

Now, in accordance with the present invention, it has been found that various mixtures of isomeric alkyl aromatic hydrocarbons are effectively separated by subjecting said mixtures to a fractional distillation in the presence of a liquid phase antimony halide. Described broadly, the invention provides a process for the separation of mixtures of the above-defined compounds, by extractive distillation of the mixtures using an antimony halide in the liquid phase as selective solvent and vapor-liquid extractive agent.

While susceptible to some variation, the extractive distillation process of the present invention is in general executed by causing the selective solvent, such as an antimony halide, to flow down the distillation column as the distillation proceeds and as vapors ascend from the kettle or boiler at the bottom of the column. Thus the solvent scrubs the vapors in a first zone, selectively dissolving the more soluble component(s) and the resulting fat solvent is partially stripped in a second zone by fresh vapor from the distillation kettle, having a higher temperature than the vapor in the first zone. As in ordinary distillation a portion of the overhead product or products is returned to the column after condensation as reflux, the reflux inlet being positioned several plates above the solvent feed port. The component dissolved by the solvent to form a solvent extract, and which extract is removed from the lower section of the column, may be recovered from the solvent by distillation or any other suitable means to produce a lean solvent which may be recirculated to the extractive distillation column.

The extractive distillation process may be, and preferably is, executed in a continuous manner, the mixture to be separated being continuously introduced into the column at a point below the solvent feed. In this operation, instead of heating the solution of the extracted component at the base of the column to supply the vapor to partially strip the descending fat solvent, a portion of the overhead vapors produced during the regeneration of the solvent and recovery of the dissolved constituent may be returned to the base of the extractive distillation column as a so-called "bottoms reflux."

As is well known in the art of extractive distillation, the conditions which are maintained in the column are preferably selected to ensure that only a single liquid phase is present on the plates, or at a given level of the column if a packed column is utilized. This means that for a given ratio of flows of a given feed material, and the solvent, the heat supplied to the column by means of the feed, bottoms reflux and/or bottoms kettle, in combination with the overhead reflux cooling, will be adjusted to maintain the desired operation.

The ease of separation of the components of a mixture by a distillation process depends upon the relative volatility of the components. Relative volatility is defined for a simple two component system in the presence of a higher boiling selective solvent as follows:

$$\alpha = \frac{P_1}{X_1} \Big/ \frac{P_2}{X_2}$$

wherein $\alpha$ = relative volatility
$P_1$ = partial pressure of first component
$P_2$ = partial pressure of second component
$X_1$ = mol fraction of the first component in the total liquid including the selective solvent.
$X_2$ = mol fraction of the second component in the total liquid including the selective solvent.

In the present invention, wherein the various components of a given mixture have the same empirical formulas and the same molecular weights, the foregoing relationship may be expressed as follows:

$$\alpha = \frac{W_1 \text{ in vapor}}{W_1 \text{ in liquid}} \Big/ \frac{W_2 \text{ in vapor}}{W_2 \text{ in liquid}}$$

wherein $W_1$ = weight of first component, and
$W_2$ = weight of second component.

Although the present invention is of particular value in the separation of isomeric $C_8H_{10}$ aromatic hydrocarbons, it may be applied as well to mixtures of other isomeric alkyl aromatic hydrocarbons, such as the isomeric methyl ethyl benzenes, the isomeric trimethyl benzenes, the diethyl benzenes, alpha- and beta-methyl naphthalene, the isomeric dimethyl naphthalenes.

Broadly defined, the solvents which are applicable in the practice of the invention are the antimony halide compounds which possess the requisite properties as required for an extractive distillation of the particular mixture to be separated into its components. In general, the antimony halide will possess the following properties: (1) be capable of forming a complex with aromatic-like compounds of the kind involved in this invention, although it is not to be implied that complex formation actually occurs under the conditions of operation of the invention; it is thought that complex formation does not actually take place; (2) be substantially higher boiling than the components of the mixture being separated; (3) be a liquid at the boiling temperature of the mixture under the pressure chosen for operation; and (4) be readily recoverable from its admixture or solution with the aromatic compound without chemical change of the aromatic compound, that is, forms a reversible admixture or solution with the aromatic compounds. Representative suitable substances are antimony trichloride, and antimony tribromide, including mixtures thereof.

The efficacy of the present invention is illustrated by the data in Tables I, II and III, which illustrative data show the alpha ($\alpha$) values for various mixtures of aromatic hydrocarbons having the empirical formula $C_8H_{10}$ in the presence of antimony trichloride.

TABLE I

*Relative volatility of ethyl benzene to para-xylene in the presence of antimony trichloride*

| Mixture [1] | | Equil. Temp. at Atm. Press. | Liquid Phase [2] | | Vapor Phase [2] | | Alpha Value |
|---|---|---|---|---|---|---|---|
| Weight Per Cent Solvent | Wt. Ratio: E-B/P-X | | Wt. Per Cent E-B | Wt. Per Cent P-X | Wt. Per Cent E-B | Wt. Per Cent P-X | |
| | | °C. | | | | | |
| None | 50:50 | ---- | ------ | ------ | ------ | ------ | 1.06 |
| 90 | 50:50 | 186 | 42.0 | 53.3 | 52.1 | 44.6 | 1.45 |
| 90 | 80:20 | 191 | 76 | 20 | 81 | 15 | 1.42 |
| 90 | 20:80 | 175 | 20 | 76 | 26 | 69 | 1.43 |
| 80 | 50:50 | 177 | 50.2 | 47.8 | 57.2 | 41.1 | 1.33 |
| 70 | 50:50 | 164 | 50.4 | 47.4 | 55.5 | 41.6 | 1.25 |
| 60 | 50:50 | 155 | 50.9 | 47.5 | 55.2 | 42.8 | 1.20 |
| 90 | 50:50 | [3]88 | 46.9 | 51.2 | 60.3 | 38.0 | 1.73 |
| [4]90 | 50:50 | 140 | 46.6 | 48.9 | 58.1 | 39.8 | 1.53 |

[1] E-B and P-X designate ethyl benzene and para-xylene, respectively.
[2] At 50 mm. of Hg pressure.
[3] Antimony trichloride—free basis.
[4] 96.5% $SbCl_3$, 3.5% $H_2O$.

TABLE II

*Relative volatility of ethyl benzene to meta-xylene in the presence of antimony trichloride*

| Mixture [1] | | Equil. Temp. at Atm. Press. | Liquid Phase [2] | | Vapor Phase [2] | | Alpha Value |
|---|---|---|---|---|---|---|---|
| Weight Per Cent Solvent | Wt. Ratio E-B/M-X | | Wt. Per Cent E-B | Wt. Per Cent M-X | Wt. Per Cent E-B | Wt. Per Cent M-X | |
| | | °C. | | | | | |
| None | 50:50 | ---- | ----- | ----- | ----- | ----- | 1.08 |
| 90 | 50:50 | 192 | 51.2 | 43.8 | 58.4 | 38.2 | 1.31 |
| 90 | 80:20 | 191 | 77 | 20 | 82 | 14 | 1.52 |
| 90 | 20:80 | 204 | 21 | 74 | 28 | 70 | 1.44 |

[1] E-B and M-X designate ethyl benzene and meta-xylene, respectively.
[2] Antimony trichloride—free basis.

TABLE III

*Relative volatility of meta-xylene to ortho-xylene in the presence of antimony trichloride*

| Mixture [1] | | Equil. Temp. at Atm. Press. | Liquid Phase [2] | | Vapor Phase [2] | | Alpha Value |
|---|---|---|---|---|---|---|---|
| Weight Per Cent Solvent | Wt. Ratio M-X/O-X | | Wt. Per Cent M-X | Wt. Per Cent O-X | Wt. Per Cent M-X | Wt. Per Cent O-X | |
| | | °C. | | | | | |
| None | 50:50 | ---- | ----- | ----- | ----- | ----- | 1.15 |
| 90 | 50:50 | 200 | 45 | 52 | 50 | 42 | 1.37 |

[1] M-X and O-X designate meta-xylene and ortho-xylene, respectively.
[2] Antimony trichloride—free basis.

Differences between the sum of the compositions in the tables and 100% are due to the presence of non-aromatic hydrocarbons, small amounts of other isomers and possible analytical error.

The data in Table I show that a solvent to mixture ratio of about nine to one, by weight, yields a good alpha value and that even with 60% of solvent substantial and effective separation is obtained. The last row of data in Table I shows that the addition of a small proportion of water not only lowers the equilibrium temperature, but, more important, it appreciably increases the alpha value.

It is to be observed that when utilizing water with the antimony chloride, precautions should be taken: (1) to minimize corrosion as by using corrosion-resistant materials of construction, (2) to avoid the use of such proportions of water as would result in the formation of two liquid phases on the plates of the column, and (3) to minimize hydrolysis of the solvent. In general, these indicated difficulties will be avoided by limiting the proportion of water in the solvent to not more than about 10%, preferably not over about 5%, by weight.

The data in the next-to-last line of Table I show that a substantially enhanced alpha value, and therefore better separation, is obtained at a reduced pressure. In general, a pressure below about 200 mm. of Hg yields a substantially higher alpha value than that obtained at atmospheric pressure. Consequently, it is advantageous to carry out the process of the invention at a sub-atmospheric pressure.

The data in Table II show that an effective separation can be made between ethyl benzene and meta-xylene by extractive distillation with antimony chloride.

As stated hereinbefore, it is general practice to separate ortho-xylene from the meta- and para-xylenes and ethyl benzene, with which it is usually associated in xylene fractions obtained from petroleum conversion and refining operations, by a normal fractional distillation. This is possible, although the separation is not entirely satisfactory, because of the difference in boiling points, which difference gives a normal alpha value of only about 1.15, as has been indicated in Table III. It is to be seen from the comparative data in Table III that considerable advantage is to be gained even in this separation by carrying out the distillation in the presence of antimony chloride.

We claim as our invention:

1. A process of separating ethyl benzene from a mixture of isomeric aromatic hydrocarbons having the empirical formula $C_8H_{10}$, which process comprises extractively distilling said mixture in contact with a liquid phase consisting essentially of antimony trichloride as selective solvent, thereby producing a distillate portion which is substantially enriched in ethyl benzene and an extract portion which is substantially enriched in xylenes and recovering the xylenes from said extract portion.

2. A process of separating ethyl benzene from a mixture of ethyl benzene and para-xylene, which process comprises extractively distilling said mixture in contact with a liquid phase consisting essentially of antimony trichloride as selective solvent, thereby producing a distillate portion which is substantially enriched in ethyl benzene and an extract portion which is substantially enriched in para-xylene and recovering the para-xylene from said extract portion.

3. A process of separating ortho-xylene from a mixture of isomeric aromatic hydrocarbons having the empirical formula $C_8H_{10}$, which process comprises extractively distilling said mixture in contact with a liquid phase consisting essentially of antimony trichloride as selective solvent, thereby producing an extract portion which is substantially enriched in ortho-xylene and a distillate portion which is substantially enriched in isomers of ortho-xylene and recovering the ortho-xylene from said extract portion.

4. A process of effecting a separation of components of a mixture of isomeric aromatic hydrocarbons having the empirical formula $C_8H_{10}$, which process comprises extractively distilling said mixture in contact with a liquid phase consisting essentially of antimony trichloride as selective solvent thereby producing a distillate portion which is substantially enriched in at least one of said isomeric hydrocarbons and an extract portion which is substantially enriched in at least another one of said isomeric hydrocarbons and recovering an aromatic hydrocarbon from said extract portion.

5. A process of separating ethyl benzene from a mixture of ethyl benzene and a xylene, which process comprises extractively distilling said mixture in contact with a liquid phase consisting essentially of an antimony halide as selective solvent, thereby producing a distillate portion which is substantially enriched ethyl benzene and an extract portion which is substantially enriched in xylene and recovering xylene from said extract portion.

6. A process of effecting a separation of components of a mixture of isomeric aromatic hydrocarbons having the empirical formula $C_8H_{10}$, which process comprises extractively distilling said mixture in contact with a liquid phase consisting essentially of an antimony halide as selective solvent, thereby producing a distillate portion which is substantially enriched in at least one of said isomeric hydrocarbons and an extract portion which is substantially enriched in at least another one of said isomeric hydrocarbons and recovering an aromatic hydrocarbon from said extract portion.

7. A process of effecting a separation of components of a mixture of isomeric aromatic hydrocarbons having the empirical formula $C_8H_{10}$, which process comprises extractively distilling said mixture in contact with a liquid phase consisting essentially of a solvent mixture of antimony trichloride and water as selective solvent and containing between zero and about ten per cent by weight of water, thereby producing a distillate portion which is substantially enriched in at least one of said isomeric hydrocarbons and an extract portion which is substantially enriched in at least another one of said isomeric hydrocarbons and recovering an aromatic hydrocarbon from said extract portion.

8. A process of effecting a separation of components of a mixture of isomeric aromatic hydrocarbons having the empirical formula $C_8H_{10}$, which process comprises subjecting said mixture to extractive distillation in contact with a liquid phase consisting essentially of antimony trichloride as selective solvent and at a reduced pressure below about 200 mm. of Hg, thereby producing a distillate portion which is substantially enriched in at least one of said isomeric hydrocarbons and an extract portion which is substantially enriched in at least another one of said isomeric hydrocarbons and recovering an aromatic hydrocarbon from said extract portion.

ALAN C. NIXON.
CARL H. DEAL, Jr.
ROY J. EVANS.

REFERENCES CITED

The following references are of record in the file of this patent:

UNITED STATES PATENTS

| Number | Name | Date |
|---|---|---|
| 1,334,033 | Houlehan | Mar. 16, 1920 |
| 2,123,642 | Gaylor | July 12, 1938 |
| 2,246,257 | Kohn | June 17, 1941 |
| 2,290,636 | Deanesly | July 21, 1942 |

OTHER REFERENCES

Berichte der Deutchen Chemische Gesellschaft, vol. 49, pages 1475–1482. Copy in Sci. Lib.

Popov: Chemical Abstracts, vol. 29, page 6034 (1935). Copy in Sci. Lib.